United States Patent [19]

Tamm et al.

[11] 4,125,453

[45] Nov. 14, 1978

[54] SPOUTED-BED SHALE RETORTING PROCESS

[75] Inventors: Paul W. Tamm, Oakland; Christopher W. Kuehler, Larkspur, both of Calif.

[73] Assignee: Chevron Research Company, San Francisco, Calif.

[21] Appl. No.: 885,244

[22] Filed: Mar. 10, 1978

Related U.S. Application Data

[63] Continuation of Ser. No. 754,197, Dec. 27, 1976, abandoned.

[51] Int. Cl.$^2$ .............................................. C10G 1/02
[52] U.S. Cl. .................................. 208/11 R; 201/12; 201/29; 201/31
[58] Field of Search ................... 208/8, 11 R; 201/12, 201/29, 31

[56] References Cited

U.S. PATENT DOCUMENTS

| | | | |
|---|---|---|---|
| 1,475,502 | 11/1923 | Manning | 201/31 |
| 2,582,711 | 1/1952 | Nelson | 201/31 |
| 2,709,675 | 5/1955 | Phinney | 208/8 |
| 2,786,280 | 3/1957 | Gishler et al. | 34/10 |
| 3,136,705 | 6/1964 | Sommers | 201/12 |
| 3,501,394 | 3/1970 | Lyons | 208/11 R |

*Primary Examiner*—Herbert Levine
*Attorney, Agent, or Firm*—D. A. Newell; R. H. Davies; R. H. Evans

[57] ABSTRACT

Disclosed is a process for the retorting of shale and other similar hydrocarbon-containing solids in which the solids to be retorted are mixed with a solid heat-transfer material to provide the necessary heat for retorting. The shale is retorted in a spouted bed of the shale and heat-transfer solids. Preferably, molecular oxygen is excluded from the retorting zone.

8 Claims, 2 Drawing Figures

SPOUTED-BED SHALE RETORTING PROCESS

This is a continuation of application Ser. No. 754,197, filed Dec. 27, 1976 now abandoned.

BACKGROUND OF THE INVENTION

This invention relates to the retorting of hydrocarbon-containing solids, particularly shale.

Shale oil is not a naturally occurring product, but is formed by the pyrolysis or distillation of organic material, commonly called kerogen, formed in certain shale-like rock. The organic material has limited solubility in ordinary solvents and therefore cannot economically be recovered by extraction. Upon strong heating, the organic material decomposes into a gas and liquid. Residual carbon typically remains on the retorted shale.

In its basic aspects, the retorting of shale and other similar hydrocarbon-containing solids is a simple operation. The major step involves the heating of the solid material to the proper temperature and the recovery of the vapor evolved. However, for a commercially feasible process, it is necessary to consider and properly choose one of the many possible methods of physically moving the solids through a vessel in which the retorting is to be carried out as well as the many other variances and operating parameters, all of which are interrelated. The choice of a particular method of moving the solids through the vessel must include a consideration of mechanical aspects as well as the chemistry and the processes involved. Further, it is necessary to consider the many possible sources of heat that may be used for the pyrolysis of destructive distillation.

In order to achieve a retorting process that is economically attractive and one which produces the maximum amount of high-quality shale oil, the various operating parameters must be controlled so that the overall process is economical, continuous and highly reliable. Any equipment used in the process must permit a high throughput of material since enormous quantities of shale must be processed for a relatively small recovery of shale oil. Process equipment for shale must have a high thermal efficiency and all mechanical devices should be as simple as possible.

In an effort to provide an economically commercial process, literally hundreds of retorting processes have been proposed, each of which offer a somewhat different choice and/or combination of the many possible operating conditions and apparatus.

One problem with many prior art processes is the quality of the shale oil obtained is relatively low. In many prior art processes long residence times at high temperature result in many secondary and undesirable side reactions, such as cracking, which may increase the production of normally gaseous products and decrease the yield and quality of the normally liquid product.

Another problem with many prior art processes is that a portion of the shale oil is combusted, which also leads to a decrease in the yield of condensable hydrocarbons. Thus, in any process designed to produce the maximum yield of high-quality condensable hydrocarbons, it is preferred that the retorting takes place in the absence of molecular oxygen and that the volatilized hydrocarbons are quickly removed from the retorting vessel in order to minimize deleterious side reactions, such as cracking or polymerization.

The quality and yield of shale oil produced is greatly dependent upon how the retorting process is operated. For example, the raw shale can be heated rapidly or slowly and the shale can be finely divided or vary widely in size. These and other factors greatly influence the quality and quantity of the shale oil produced and the overall thermal efficiency of the process. In essentially all processes for the retorting of shale, the shale is first crushed to reduce the size and time necessary for retorting. Crushing is very expensive and large amounts of energy are required in breaking up the shale and in separating the shale into various size ranges. During the crushing and mining of the shale, it is difficult to obtain uniformly sized pieces and/or to separate the crushed shale into various sizes. Also, it is extremely expensive to crush all of the shale to a very small uniform size. Furthermore, many prior art processes cannot tolerate excessive amounts of shale below about ½-inch, while in other prior art processes all of the shale to be processed must be very small, less than 100 mesh, as is required in entrained-bed processes or of relatively uniform small size as is required in fluidized-bed processes. It is, therefore, desirable to have a retorting process which can accommodate intermediate-sized shale thus reducing the amount of crushing required. However, it is further desirable that such a process can handle the fines which necessarily result in any crushing operation.

Another problem with many prior art processes, particularly with countercurrent flow processes, is that after the shale oil has been vaporized, it then comes in contact with countercurrent flowing solids which are at a much cooler temperature, which leads to condensation of a portion of the shale oil and reabsorption of a portion of the vaporized shale oil into the downflowing shale. This condensation and reabsorption leads to coking, cracking and polymerization reactions, all of which are detrimental in regard to producing the maximum yield of condensable hydrocarbons.

In one aspect of the present invention, a countercurrent flowing stripping gas is utilized. Retorting processes using countercurrent flow of stripping gases are well known in the art, for example, U.S. Pat. No. 3,736,247, describes a process wherein shale is fed onto the top of a vertical retort and moves downward countercurrent to the flow of upward flowing stripping gas.

Another aspect of the present invention involves the use of a solid heat-transfer material to provide the necessary heat for the retorting process. The use of solid heat-transfer materials are also known in the art as shown, for example, in U.S. Pat. No. 2,788,314.

The present invention also makes use of the contacting of solids in a spouted bed. Spouted bed contacting of solids is taught in U.S. Pat. Nos. 2,786,280; 3,231,413 and 3,242,586 and also in the book, "Spouted Beds", Mathur et al, Academic Press (1974). Also in a PhD thesis by Berti, "Operational Criterion of a Spouted Bed Oil Shale Retort", Colorado School of Mines (1968), disclosed in a spouted bed shale retorting process wherein the heat for the retorting process is provided by combusting a portion of the shale in the spouted bed. Furthermore, in the Berti process, the shale particles are circulated in the spouted bed until the particle size is reduced by attrition to the point where the retorted shale fines are elutriated out of the top of the bed.

SUMMARY OF THE INVENTION

A continuous process for retorting hydrocarbon-containing solids which comprises:

(a) directing a jet of gas substantially vertically up into a vessel containing subdivided solids, said solids comprising hydrocarbon-containing solids and heat-transfer solids, thereby forming a spouted bed of said solids in said vessel, said spouted-bed comprising as the minor volume of said bed a rapidly moving upward spout of said solids in dilute suspension in said gas, and as the major volume of said bed a downwardly, relatively slowly moving annular columnar loosely packed body of said solids;

(b) continuously introducing into said vessel heat-transfer solids at an elevated temperature and hydrocarbon-containing solids, said solids being introduced into said vessel by entraining said solids in said jet of gas;

(c) continuously withdrawing retorted solids and said heat-transfer solids from said vessel, said retorted solids and said heat-transfer solids being withdrawn from a lower portion of the body portion of said spouted bed; and (d) continuously withdrawing vaporized hydrocarbons from an upper portion of said vessel.

Preferably, the gas is maintained essentially free of oxygen and essentially all of the heat for the retorting process is supplied by the heat-transfer solids.

DETAILED DESCRIPTION OF THE INVENTION AND PREFERRED EMBODIMENTS

One object of the present invention is to provide an economic process for the retorting of shale which requires only a moderate amount of shale crushing.

Another object of the present invention is to provide a process for maximizing the yield of condensable hydrocarbons combined with the minimum production of gaseous products from shale.

A further object of the present invention is to produce retorted shale containing the minimum amount of residual volatizable hydrocarbons.

Another object of the present invention is to provide a continuous retorting process which has a high thermal efficiency, along with a high throughput of solids.

Another object of the present invention is provide a retorting process which can handle intermediate-size crushed shale.

The process of the present invention will generally be described with reference to the processing of shale. However, the process of the present invention can also be used to retort other hydrocarbon-containing solids as defined herein.

The term "hydrocarbon-containing solids" as used herein includes oil shale, oil sand, coal, tar sands, gilsonite, mixtures of two or more of these materials or any other hydrocarbon-containing solids with inert materials, etc.

As used in the present invention, the term "oil shale" is intended to mean inorganic material which is predominantly clay, carbonates and silicates in conjunction with solid organic materials composed of carbon, hydrogen, sulfur, oxygen and nitrogen, called kerogen.

The term "retorted solids" is used in the present application to mean hydrocarbon-containing solids from which essentially all of the volatizable hydrocarbons have been removed, but which may still contain residual carbon.

The term "spent solids" is used in the present invention to mean retorted solids from which most, and preferably essentially, all of the combustible residual carbon has been burned.

The terms "condensed", "noncondensable", "normally gaseous", or "normally liquid" are relative to the condition of the material at 77° F. (25° C.) and one atmosphere.

The process of the present invention utilizes a spouted bed for the contacting of solids. Spouted bed technology is well known in the art and is described, for example, in U.S. Pat. No. 2,786,280, the entire disclosure of which is incorporated herein by reference. The various uses and operating parameters required for spouted bed operation are also discussed in detail in the book, "Spouted Beds", Mathur et al., Academic Press (1974), the entire disclosure of which is incorporated herein by reference.

The process of the present invention will best be understood by reference to the accompanying figures.

Figure 1:
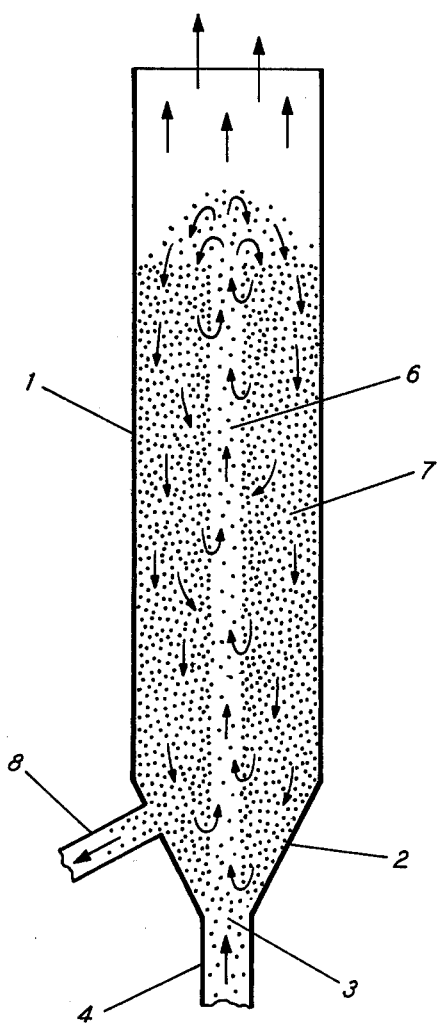
FIG. 1 is a flow diagram illustrating the flow of gases and solids in a spouted bed.

Referring now to FIG. 1. FIG. 1 shows a vessel 1 having a bottom extension 2 in the form of an inverted cone. An aperture 3 is provided in the bottom of the extension 2 connected to an inlet pipe 4. Provided that the gas flow is within the proper range, as discussed hereinafter, a spout 6 will be formed in a central core of the mass of subdivided solids as indicated in FIG. 1. The bed of subdivided solids comprises hydrocarbon-containing solids and heat-transfer solids.

The gas flow at the bottom of the vessel 1 is essentially confined to spout 6. However, at the top of the spout, only a portion, generally less than half, of the flow is confined to the spout 6. Thus, there is a continual migration of gas into the mass of solids surrounding the core as the gas proceeds up the spout 6. The spout 6 comprises a minor volume of the bed in which the solids are rapidly moving upward in dilute suspension in the gas. The major volume of the bed, referred to as the body portion or annular portion 7, comprises a downward, relatively slowly moving, columnar, loosely packed body of solids. The passage of gas from the spout 6 into the annulus is not sufficient, however, to cause fluidization and the annulus retains essentially the characteristics of a moving packed bed. The upflowing gas serves four purposes. First, the gas forms and maintains the bed in a spouted condition. Secondly, the gas serves to introduce fresh shale and hot heat-transfer solids into the vessel and causes the two to be rapidly mixed resulting in considerable heat transfer. Thirdly, the gas acts as a stripping gas and quickly transports the vaporized hydrocarbons out of the vessel which helps avoid condensation and secondary side reactions. Fourthly, the gas serves to entrain out of the vessel any fines contained in the feed stream or formed in the vessel.

A jet of gas (lift gas) is directed substantially vertically up into the vessel. The gas is preferably noncombustion supporting, that is, it contains essentially no molecular oxygen. Entrained in the gas, when it enters the vessel, are the heat-transfer solids and the hydrocarbon-containing solids, particularly shale. Typically, the linear velocity of the lift gas upon entering the bed will be in the range 50 to 150 feet per second, preferably 90 to 110 feet per second. The lift gas contains essentially no free oxygen (less than 1 volume percent) so as to prevent or minimize combustion in the retort and avoid the loss of product hydrocarbons through combustion. The gas may be introduced at an elevated temperature in the range 100° to 1000° F., but preferably is introduced at ambient temperature. Lift gas is preferably relatively inert to the shale and may comprise steam, $H_2$, CO, $CO_2$, light hydrocarbons, such as methane, ethane, or propane. Preferably, the lift gas comprises recycled light product gas from the retort comprising a mixture of $H_2$, CO, $CO_2$, methane and ethane.

In the spout portion of the bed, solids are rapidly mixed by the turbulent action of the gas and considerable heat transfer and some retorting occurs in the spout portion of the bed. The shale is rapidly heated to an elevated retorting temperature generally greater than 650° F. Preferably, the average temperature of the shale in the bed is maintained in the range 700° to 1300° F., and more preferably 800° to 1000° F.

The term "sprouting" is used in the true sense, and it indicates a very rapid upward movement or the particles as shown in the figure. As is also indicated, the force of the spout 6 causes a fountain of solids at the top of the bed and the solids fall from this fountain onto the outer portion of the bed surrounding the spout. There is a steady downward movement of the solids in the outer or annular portion of the bed, for example, at a rate of about 1 to 2 inches per second. At the same time, the solids are continually tending to be drawn towards the spout 6 during their passage in packed form down the vessel 1. Some of the solids that reach the periphery of the spout are picked up by the gas jet and carried to the top of the bed, while others continue vertically downward as part of the annulus. The extent of the lateral movement varies, and depends on such factors as the solids shape, bed diameter and gas velocity. With shale crushed to a size in the range below 5 mesh, but 90 volume percent above 200 mesh, the gas velocity will typically be in the range 90 to 110 ft/sec with a bed depth ranging from 1 to 3 times the bed diameter. Solids are continuously withdrawn via outlet 8 from a lower portion of the annular body portion of the bed as shown in FIG. 1. The solids withdrawn comprise retorted shale and heat-transfer solids.

As the solids pass upwardly through the vessel, they are rapidly heated to an elevated retorting temperature and as they move more slowly downwardly along the column portion of the bed, and retorting continues and the vaporized hydrocarbons are swept out of the vessel. Preferably, all of the gaseous product is withdrawn out of the top of the bed but because of the expanding volume of gas due to the retorting, some gas can be withdrawn from the sides of the vessel while still maintaining the bed in a spouted state.

The size of the shale should be less than ½ inch and preferably less than 5 mesh. Preferably the shale is substantially (90 volume percent or more) in the size range ½ inch to 200 mesh, and more preferably substantially in the size range ¼ inch to 200 mesh. Preferably the shale size is relatively uniform in order to best maintain spouting conditions within the vessel. However, it has been found that some fines can be included in the raw shale feed without impairing the stability of the spouted bed. The term "fines" as used in the present invention includes any solids introduced into the vessel or formed in the vessel which are too small to be spouted and which are entrained out of the top of the bed. The fines will be swept out of the bed and not drop into the annulus portion of the downward moving bed. Preferably, the amount of fines is limited to less than 10 weight percent of the feed material in order to maintain spouted bed conditions.

The heat-transfer solids are preferably of the same size as the raw shale feed, that is, less than ½ inch and containing minimum fines. The heat-transfer solids can comprise any of a number of substances, such as sand, steel, ceramic balls, etc., provided the material exhibits relatively similar spouting properties such that both the shale and the heat-transfer solids behave similarly in forming a spouted bed. Preferably, the heat-transfer solids are inert and comprise coarse spent shale which has been heated to an elevated temperature by combustion of the residual carbon remaining after retorting.

Shale can be introduced into the vessel over a wide range of temperatures, but preferably is introduced at from 70° to 400° F. and more preferably introduced at ambient temperature.

The heat-transfer materials are introduced at an elevated temperature in the range of 1000° to 2000° F. or higher, but preferably in the range 1200° to 1600° F. The quantity and temperature of the heat-transfer solids introduced into the vessel can readily be adjusted to heat the raw shale to the desired retorting temperature. The weight ratio of the heat-transfer solids to the fresh shale introduced will generally be in the range from 0.5 to 10, preferably in the range 1.0 to 5.0.

The process of the present invention offers many advantages over prior art processes, more specifically:

(1) the intense mixing in the central core provides the necessary mixing for rapid heating of the shale to the desired retorting temperature;

(2) the countercurrent flow of gas in the annulus results in rapid removal of the vaporized hydrocarbons from the vessel;

(3) fines are continuously elutraited overhead, leaving a favorable shale mixture amenable to countercurrent stripping.

(4) grinding costs are kept reasonable since the shale must necessarily be of rather large size to be able to be spouted;

(5) the shale is moved through the entire retorting system by highly efficient and simple means;

(6) the process has high thermal efficiency since the raw shale can enter the system cold, and preheating of the lift gas may not be required;

(7) the process provides for high throughput of solids for relatively small sized retorting vessels, which results in substantial reduction in capital costs;

(8) the quality and quantity of condensable hydrocarbons is increased by avoiding condensation of the volatilized hydrocarbons in the retorting vessel; and (9) the quality of the gaseous product is higher than in processes where molecular oxygen is introduced into the retort.

Figure 2:
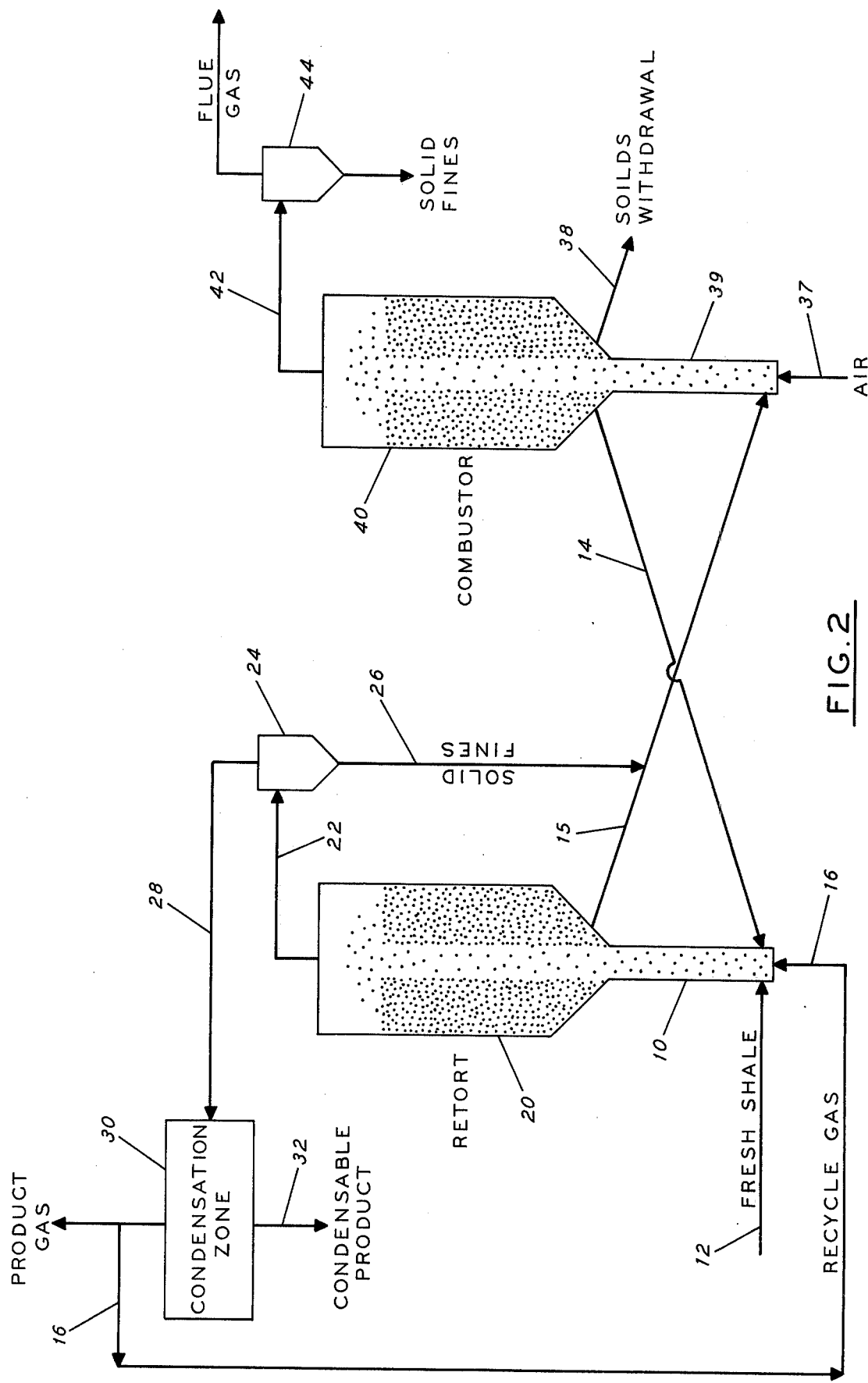
FIG. 2 is a schematic flow diagram illustrating the flow of gas and solids along with various other auxiliary process equipment for one preferred embodiment of the invention.

The invention is further described in reference to FIG. 2 which illustrates one preferred embodiment of the invention, utilizing a spouted bed retort combined with a spouted-bed combustor.

Fresh crushed shale having a size range of 5 mesh minus is fed into a lift pipe 10 via line 12 and spent shale, heated to a temperature in the range 1200° to 1600° F., is fed into the lift pipe via line 14. The total solids feed to the retort contains 1 to 10% fines which are entrained through the vessel 20 because of their small size. In order to assure that all of the volatilizable hydrocarbons are recovered from these fines, a lift pipe 10 has been provided in order that the residence time of the fines can be increased sufficiently to insure complete retorting.

The lift pipe can vary widely in length and in diameter depending on the size of the shale, and the desired increase in residence time. Recycled product gas comprising $H_2$, CO, $CO_2$ and $C_1$–$C_3$ hydrocarbons is introduced via line 16 and it utilized to carry the fresh shale and heated spent shale through the lift pipe and into the retort.

The spouted bed is operated as previously described with regard to FIG. 1 and the solid fines and product gases are removed from the vessel 20 via line 22. The elutraited solids are separated in a hot cyclone or other conventional separator 24 and the solids are fed to combustor 40 via lines 26 and 15 in order to recover the heat value of the residual carbon remaining on the fines. The hot gases are passed from cyclone 24 via line 28 to condensation and separation zone 30 wherein the normally condensable hydrocarbons are separated and removed via line 32. A portion of the normally noncondensable products is recycled via line 16 to provide the necessary gas flow to maintain spouting in the retort.

Retorted solids are removed from the retorting vessel 20 via line 15 and are fed to combustor 40 via lift pipe 39. Lift pipe 39 serves the same function as the lift pipe 10, that is, it increases the residence time of fines which might otherwise be entrained through the combustor prior to complete combustion. Combustion air is injected by conventional means via line 37 and serves the purpose of entraining the solids and forming the spout in combustor 40. In combustor 40 the solids reach a temperature in the range 1200° to 1600° F. Also, due to the high temperature and the extreme turbulence in the lift pipe and in the spout considerable attrition takes place and the larger solids disintegrate into fines which are entrained out of the vessel via line 42 along with the flue gas. These solid fines are separated from the flue gas in separator 44 and the fines are disposed of. The coarser solids are removed from the combustor 40 via line 14 and utilized as the heat-transfer solids for the retort. Any coarse solids not required for heat transfer in zone 20 can be removed via line 38 for disposal. Preferably, the fines and any coarser solids not recycled are disposed of after the heat has been recovered from them, for example, by preheating the combustor air 37 or the retort recycle gas 16. The heat in the flue gas can also be utilized to preheat the recycle gas or combustion gas.

The preferred embodiment of the invention illustrated in FIG. 2 provides additional advantages over those previously described, more specifically:

(1) use of the spouted-bed combustor provides a solids separation device for obtaining the proper sized solids for the spouted bed retort, that is, solids which are too small for a spouted bed are entrained out of the combustor vessel and thus cannot interfer with the formation of the spouted bed in the retort;

(2) the retort lift pipe allows for complete recovery of the vaporizable hydrocarbons from the fines while the combustor lift pipe allows for complete recovery of the heat value of the residual carbon present in the fines; and (3) the integration of the two spouted beds provides a process of high thermal efficiency combined with mechanical simplicity in processing large volumes or solids.

What is claimed is:

1. A continuous process for retorting oil shale which comprises:
    (a) directing a jet of essentially oxygen-free gas comprising recycled light product gas substantially vertically at a linear velocity of 50 to 150 feet per second up into a vessel containing subdivided solids including oil shale and heat-transfer solids, thereby forming a spouted bed of said solids in said vessel, said spouted-bed comprising as the minor volume of said bed, a relatively rapidly moving upward spout of said solids, and as the major volume of said bed a downwardly, relatively slowly moving, annular, columnar, loosely packed body of said solids, a portion of said gas flowing upwardly countercurrently to said solids in said annular body for stripping vaporized hydrocarbons from said solids in said annular body;
    (b) continuously introducing into said vessel heat-transfer solids, at an elevated temperature of at least 1000° F., and oil shale, said heat-transfer solids and oil shale being introduced into said vessel by entrainment in said jet of gas;
    (c) continuously withdrawing retorted solids and said heat-transfer solids from said vessel, said retorted solids and said heat-transfer solids being withdrawn from a lower portion of the body portion of said spouted bed; and
    (d) continuously withdrawing vaporized hydrocarbons from an upper portion of said vessel.

2. The process of claim 1 wherein said oil shale is substantially in the size range ½-inch to 200 mesh.

3. The process of claim 1 wherein said oil shale is substantially in the size range ¼-inch to 200 mesh.

4. The process of claim 1 wherein said heat-transfer solids comprise spent oil shale.

5. The process of claim 1 wherein from 1 to 10 weight percent of said oil shale introduced into said vessel comprises shale fines which are entrained through said vessel and are withdrawn from said vessel as retorted shale fines along with said vaporized hydrocarbons.

6. The process of claim 1 wherein said spouted bed is maintained at an average temperature in the range 800° to 1000° F., and said heat-transfer solids are introduced at a temperature in the range 1200° to 1600° F.

7. The process of claim 1 comprising the additional step of introducing said retorted shale into a combustor and combusting the residual carbon on said retorted shale forming spent shale at an elevated temperature in the range 1000° to 2000° F. and introducing said spent shale into said spouted bed as said heat-transfer solids.

8. The process of claim 7 wherein said combustor is a spouted-bed combustor.

* * * * *